(12) United States Patent
Frase et al.

(10) Patent No.: US 6,789,363 B1
(45) Date of Patent: Sep. 14, 2004

(54) SECURITY ROOM FOR INFORMATION TECHNOLOGY FACILITIES

(75) Inventors: Hans-Jürgen Frase, Niederdreisbach (DE); Martin Bähner, Betzdorf (DE)

(73) Assignee: Otto Lampertz GmbH & Co. KG, Wallmenroth (DE)

( * ) Notice: Subject to any disclaimer, the term of this patent is extended or adjusted under 35 U.S.C. 154(b) by 0 days.

(21) Appl. No.: 09/856,101

(22) PCT Filed: Apr. 20, 1999

(86) PCT No.: PCT/EP99/02637
§ 371 (c)(1),
(2), (4) Date: Aug. 17, 2001

(87) PCT Pub. No.: WO00/29685
PCT Pub. Date: May 25, 2000

(30) Foreign Application Priority Data

Nov. 17, 1998 (DE) .......................... 198 52 927

(51) Int. Cl.[7] ............................. E04C 2/284; E04C 2/52
(52) U.S. Cl. ........................ 52/220.8; 52/232; 52/235; 52/264; 52/309.11; 52/464; 52/468; 109/58; 109/78; 109/79
(58) Field of Search .................... 52/235, 232, 265, 52/309.5, 309.9, 309.11, 404.1, 406.2, 404.2, 404.4, 463, 464, 468, 220.8; 109/58, 78, 79, 83, 84

(56) References Cited

U.S. PATENT DOCUMENTS

| 4,099,355 A | 7/1978 | Strunk |
| 4,455,801 A * | 6/1984 | Merritt ...................... 52/309.9 |
| 6,550,819 B2 * | 4/2003 | DeSanto, Sr. ............... 285/192 |

FOREIGN PATENT DOCUMENTS

| AU | 358 247 | 8/1980 |
| DE | 26 30 479 | 1/1978 |
| DE | 30 10 031 | 10/1981 |
| DE | 35 28 679 | 10/1986 |
| EP | 541 506 | 5/1993 |
| FR | 2 673 224 | 8/1992 |
| GB | 504 255 | 4/1939 |
| GB | 1 516 589 | 7/1978 |
| JP | 09324480 | 12/1997 |
| JP | 10002040 | 1/1998 |

* cited by examiner

Primary Examiner—Carl D. Friedman
Assistant Examiner—Yvonne M. Horton
(74) Attorney, Agent, or Firm—Pauley Petersen & Erickson

(57) ABSTRACT

A security room for information technology facilities, which exhibits fireproof side walls having a sealing door, a floor and a ceiling. This invention provides a security room designed in a simple way and readily adapted to different spatial configurations, while exhibiting a good fireproofing capacity. The side walls, the floor surrounded by the side walls, and the ceiling are assembled in a modular manner from individual members which are laid side-by-side and connected together by fireproofing materials.

20 Claims, 3 Drawing Sheets

SECURITY ROOM FOR INFORMATION TECHNOLOGY FACILITIES

BACKGROUND OF THE INVENTION

1. Field of the Invention

This invention relates to a secure room for devices in connection with information technology, having fireproof side walls with a sealing door, a floor and a ceiling.

2. Description of Related Art

A secure room for receiving devices in connection with information and control technologies is known. This secure room constructed in accordance with EN 1047 is intended to assure, in the event a fire occurs, that the information technology devices are not destroyed over a defined period of time, for example 90 minutes, and can continue to operate in order to secure important control functions and data. A secure room is permanently installed in a conventional room of a building, for example, the room of which is appropriately lined.

SUMMARY OF THE INVENTION

One object of this invention is to provide a secure room of the type mentioned above but which can be simply constructed.

This object is attained by the characteristics as described in this specification and in the claims. In accordance with this invention the side walls, the floor enclosed by the side walls and the ceiling are assembled in a module-like manner from individual elements, which are arranged next to each other and are connected with each other in a fireproofing manner. The module-like construction of the fire-protection room from the side walls, the floor enclosed by the side walls and the ceiling, results in a simple installation with simple, accessibly arranged elements, wherein the modules can be combined into small or large components with different length and width relationships in accordance with the spatial conditions. Here, the connection points are also designed to be fireproof. Also, storage by components is possible.

If the width of the side wall elements, which extend in one piece from the floor to the ceiling is in a whole number, including 1, relationship with the width of the ceiling elements, or vice versa, wherein in the assembled state two longitudinal edges of one or several side wall elements are aligned with two associated longitudinal edges of one or several ceiling elements, then the width of the side wall element, or of the ceiling element, possibly the wider of the two, forms a base unit which determines the width of the smallest possible component. A structure would also be conceivable, but less advantageous, wherein the alignment of the longitudinal edges of the ceiling elements and of the side wall elements is only repeated after several elements, wherein the width of one element would not determine the width of the smallest room module, but wherein a module-like construction would also be possible in which the smallest room unit would correspond to a multiple of the width of a ceiling element, or of a side wall element, namely the larger of the two.

With a design wherein the length of a ceiling element corresponds to a whole number multiple, including 1, of the width of a side wall element, a room unit exactly corresponds in length to a ceiling element and, with a rectangular or square room, the latter can be spanned by merely one ceiling element in the longitudinal direction of the ceiling element. For enlarging the room in the direction of the long extension of the ceiling elements, it is also possible to line up several ceiling elements in the long direction of the ceiling elements, wherein it is assured that the vertical edge of the last side wall element is aligned with the narrow edge of the ceiling element.

The steps, wherein the width of the side wall elements corresponds to a whole number multiple of the width of the floor elements, or vice versa, are advantageous for a simple construction.

The fire-protected construction and the insulation with the chance of protectively housing installed elements is favored because the floor in the form of a double-deck floor has a lower floor element and a spaced-apart upper floor element, and both the lower floor element and the upper floor element are enclosed in the lateral walls.

The difficulty of dependably connecting and sealing corners is overcome because the corners of the side walls are constructed of one-piece corner elements.

Furthermore, steps are advantageous for simple mounting and a solid structure, wherein the undersides of the side walls are received in a floor profile, which is fastened on a floor of the building. On a top the side wall elements and the corner elements are downwardly offset on the inside in an L-shaped cross section, and the edges of the ceiling elements associated with the side walls are complementary offset toward the top in an L-shape. The edges between the side walls and the ceiling are covered on the outside by angle-shaped profiled linings covering the joints. It is possible with these measures to assemble the wall elements simply and clearly with good sealing.

Damage to the wall elements is prevented, and a simple and dependable connection is assured because fireproof sealing elements are arranged between the side wall elements, the corner elements and the ceiling elements, and because the side wall elements, the corner elements and the ceiling elements are held together and aligned by connection elements, which press the sealing elements together. A high degree of fire protection, along with a relatively light and simple construction of the wall elements is accomplished because the side wall elements, the corner elements, as well as the ceiling elements are constructed in layers with outer steel layers on their two exterior sides and with at least two layers between them, which counteract high temperatures in the interior of the room.

A functionally capable equipment of the secure room with a protected electrical supply is available because a lighting fixture and an air-conditioning device are provided in its interior. The supply cables are sealingly introduced into the interior through a fire-protected cable duct installed in a side wall and having a clampable packing frame. Arranged in the packing frame, are elastic sealing modules, which can be adapted to cables of various diameters. A fire extinguisher installation with outlet openings for extinguishing means distributed over the ceiling, a device for removing used fire-extinguishing means and a fire protection slide, as well as a control device for receiving sensor signals and triggering actuators are provided.

BRIEF DESCRIPTION OF THE DRAWINGS

This invention is explained in greater detail in view of exemplary embodiments shown in the drawings, wherein.

DESCRIPTION OF PREFERRED EMBODIMENTS

Figure 1:
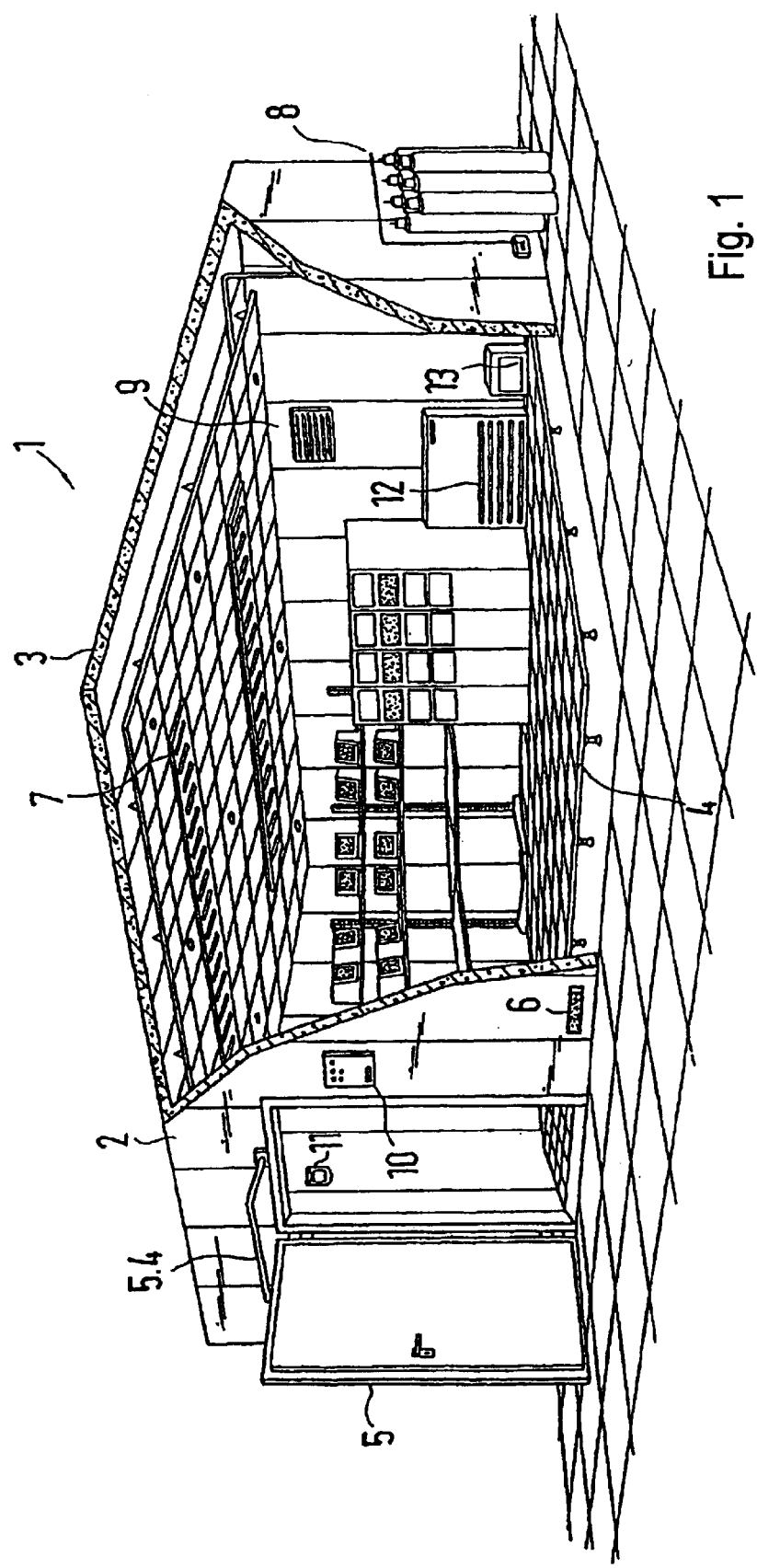
FIG. 1 is a perspective view of a secure room with partially cut open walls.

In a perspective view, FIG. 1 shows, as the essential elements of a secure room 1, side walls 2 with a door 5, a ceiling 3, as well as a double-deck floor 4, wherein the side walls 2, the ceiling 3 and the floor 4 are assembled in a modular form from individual wall elements. Various components of the information or control technology are housed in the room, as well as an air-conditioning device 12 and a light fixture 7. A firefighting device 8 with reservoirs containing firefighting agents arranged on the outside, and lines and outlet openings arranged in the ceiling of the interior of the fireproof room 1, and a device 9 for removing used fire-extinguishing means, are provided in case of fire. An electronic control system 10 is arranged on an outside, and a motion sensor 11 is attached in the interior. An interruption-free power supply 13 is provided in the interior, in one embodiment. A cable inlet 6 for the current supply for the electrical components arranged in the interior of the secure room 1 is installed in one side wall 2.

Figure 2:
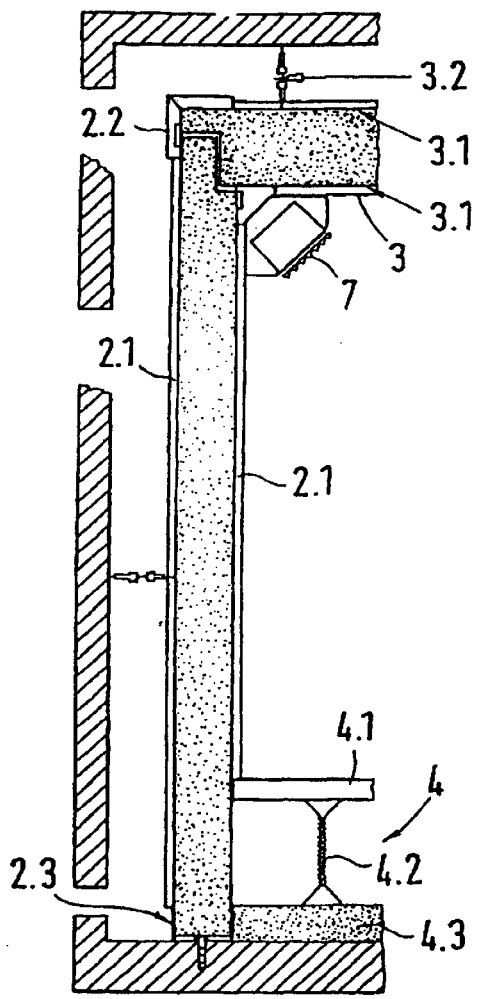
FIG. 2 is a cross section of a portion of the secure room installed in a room of a building.
Figure 3A:
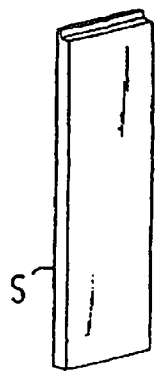
FIGS. 3a to 3d show various wall elements, each in a perspective view.
Figure 3B:
Figure 3C:
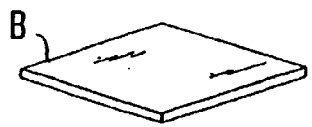
Figure 3D:
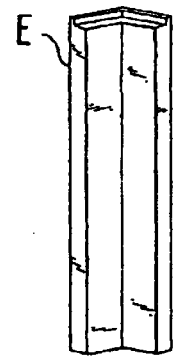
Figure 4A:
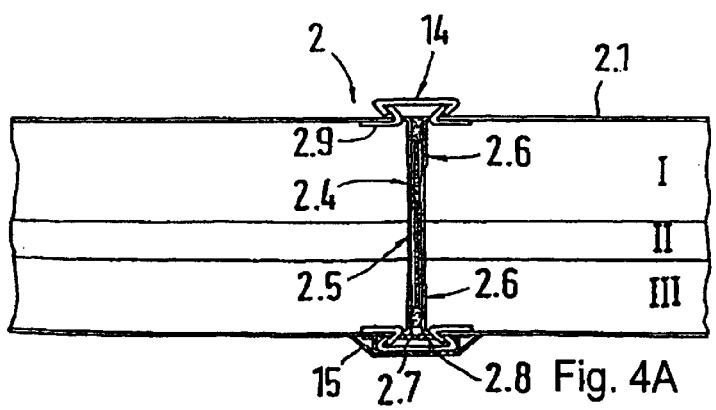
FIGS. 4A and 4B show a connection area between wall elements in a plan view and a lateral view.
Figure 4B:
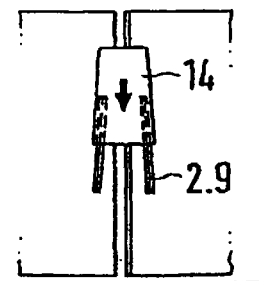

FIGS. 3a to 3d show the various wall elements in the form of a side wall element S, a ceiling element D of the same width, a floor element B and a corner element E, whose lateral parts preferably correspond to the width of a side wall element S. In FIGS. 2, 4A and 4B the structure of the wall elements are shown in cross section, as well as their connecting area. In accordance with this, the side wall elements S and the ceiling elements D, and correspondingly also the corner elements E, include an outer layer 2.1, or 3.1, made of sheet steel, so that a coffer-like structure is formed and several fireproof layers I, II, III of an insulating material are housed between the two outer layers 2.1, or 3.1, which has a retarding effect in case of fire, so that a maximum permissible threshold value load on the information technology device will not be exceeded for 90 minutes, for example.

The corner area between the side wall element S and the ceiling elements D is covered by means of an angled profiled lining 2.2, wherein the vertically downward oriented leg of the profiled lining 2.2 extends over the connecting area between the side wall elements S and the ceiling element D. The adjoining edges of the side wall element S and of the ceiling element D are complementarily designed in an L-shape, so that the side wall elements S and the ceiling elements D can be easily and clearly put together with good sealing. Sealing means with an expansion seal 2.5 arranged in the center of the cross section, with high-temperature seals 2.6 arranged laterally of the expansion seal 2.5, with a sealing tape 2.7 arranged on the outside, and with a sealing material 2.8 provided between the sealing tape 2.7 and the high-temperature seal 2.6, are arranged between the long sides of the side wall elements S and the ceiling elements D. The critical connecting points are designed to be fireproof with this sealing design. Connecting tongues 2.4 adjoin the sealing means at the front with respect to the wall elements.

For the simple and assured cohesion of the wall elements in the transition areas, connecting elements 2.9 with grooves, laterally open to the outside and tapering conically toward the top, are formed on the outer layer 2.1, as shown in FIGS. 4A and 4B. Correspondingly matched closure elements 14, which taper toward the top and engage the grooves, are pressed on the connecting elements 2.9, so that the sealing means are pressed together and a tight connection is created. The connecting areas between the individual wall elements provided with the connecting elements 2.9 and the closure elements 14 are covered, preferably in the interior, by means of a profiled lining 15, which is trapezoidal in cross section. Fastening brackets 18 for built-ins can be attached to the profiled linings 15 in the room interior. The connecting areas between the wall elements themselves do not have any bores or screw holes which could result in the fireproofing being less effective.

As shown in FIG. 2, the side wall elements S are fixed in place by means of profiled floor sections 2.3, which are anchored in the floor of the building and are U-shaped in cross section, so that the side wall elements S are securely maintained and are simple to install. The ceiling elements can be fastened on the ceiling of the room by means of holders 3.2. The floor 4, designed as a double floor, includes a lower floor element 4.3 and an upper floor element 4.1, which is at a distance and fixed on it by connecting means 4.2, and is enclosed as a whole by the side walls 2, so that also in this area good sealing assures good fire protection. The light fixture 7 can be arranged in the area of the inner edge between the side walls 2 and the ceiling 3 instead of on a suspended additional ceiling in accordance with FIG. 1, wherein a cable duct 7.1 can also be provided there, for example as in accordance with FIG. 5.

For the tight and fireproof closing of the door 5, a seal packing 5.3 is inserted all around into door casings 5.1, 5.2 and the door is appropriately fitted and is constructed of fireproof materials. The door 5 has a door closer 5.4, as shown in FIG. 1.

Figure 5:
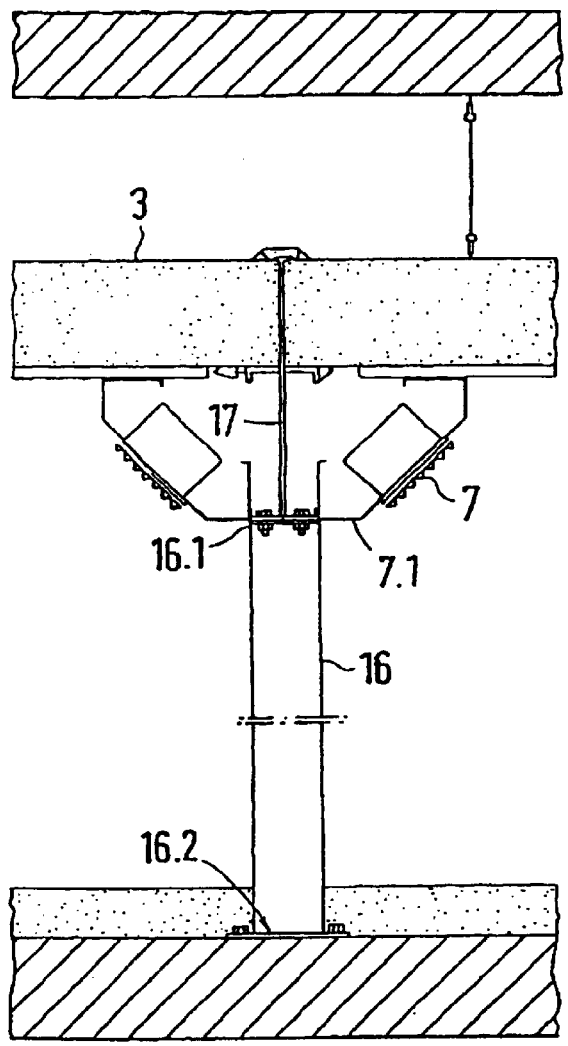
FIG. 5 shows a support device in a larger secure room.
Figure 6:
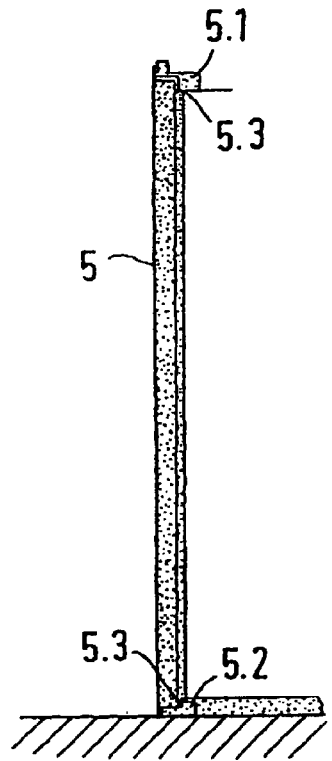
FIG. 6 shows an installed door in cross section.

FIG. 5 shows the support of adjoining ceiling elements D by means of a profiled support 17, extending under the connection point, and of a pillar 16, which is supported under it on the floor and is anchored on the profiled support 17 by means of a head plate 16.1, and on the floor of the building by means of a foot plate 16.2. Cable conduits 7.1 are formed on both sides in the area of the profiled support 17, and lighting fixtures, which radiate obliquely downward into the room, are there installed.

Figure 8:
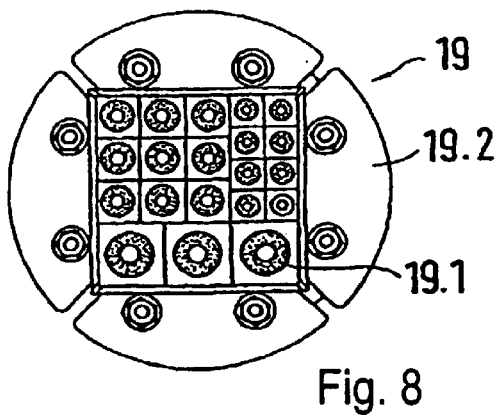
FIG. 8 shows a cable duct between the outside and the inside of the secure room.
Figure 7:
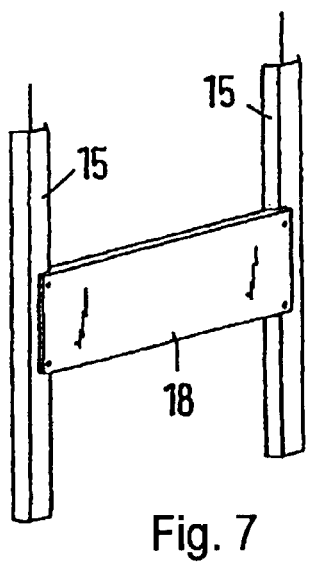
FIG. 7 shows a built-in element in the secure room.

The cable inlet 6 shown in FIG. 1 can be constructed in accordance with the cable duct 19, shown in FIG. 8. The cable duct 19 has an outer packing frame 19.2, into which sealing modules 19.1 are inserted for the respective cables. After being installed, the packing frame is radially narrowed by tightening of screws, so that the sealing modules 19.1 are compressed. The sealing modules 19.1 contain shells, which are placed inside each other in layers, so that they can be matched to different cable diameters.

It is possible in a simple manner by means of the described measures to assemble secure rooms of various sizes in a modular manner. The structural parts form a kit assembled fro simple elements with correspondingly simple storage requirements.

What is claimed is:

1. In a secure room for devices in connection with information technology, having fireproof side walls (2) with a sealing door (5), a floor (4) enclosed by the side walls (2) and a ceiling (3) wherein the side walls (12), the floor (4) and the ceiling (3) are each assembled from individual elements arranged side-by-side and connected with each other, the improvement comprising:

the individual elements including side wall elements (S), one-piece corner elements (E) of the side walls (2), floor elements (B) and ceiling elements (D);

fire-protective sealing elements arranged between the side wall elements (S), the corner elements (E) and the ceiling elements (D), and the side wall elements (S), the corner elements (E) and the ceiling elements (D) pressed together and aligned by connection elements (2.9, 14) which compress the sealing elements, a lighting fixture (7) and an air-conditioning device (12) provided in an interior of the secure room, and supply cables sealingly introduced into the interior through a fire-protected cable duct (19) installed in one of the side walls (2) and having a clampable packing frame (19.2) and arranged in the cable duct (19) are elastic sealing modules (19.1) which are adaptable to cables of various diameters.

2. In the secure room in accordance with claim 1, wherein the side wall elements (S) extend in one piece from the floor (4) to the ceiling (3), and in an assembled state two longitudinal edges of at least one of the side wall elements (S) are aligned with two associated longitudinal edges of at least one of the ceiling elements (D).

3. In the secure room in accordance with claim 2, wherein a length of a ceiling element (D) is equal to a multiple of a width of one of the side wall elements (S).

4. In the secure room in accordance with claim 3, wherein the width of one of the side wall elements (S) is equal to a multiple of a second width of one of the floor elements (B).

5. In the secure room in accordance with claim 4, wherein the floor (4) is in a form of a double-deck floor having a lower floor element (4.3) and a spaced-apart upper floor element (4.1), and the lower floor element (4.3) and the upper floor element (4.1) are enclosed in the side walls (2).

6. In the secure room in accordance with claim 5, wherein undersides of the side walls (2) are received in a floor profile (2.3) which is fastened on a building floor of the building, on a top the side wall elements (S) and the corner elements (E) are downwardly offset on an inside in an L-shaped cross section, and edges of the ceiling elements (D) associated with the side walls (2) are complementary offset toward the top in an L-shape, and the edges between the side walls (2) and the ceiling (3) are covered on an outside by angle-shaped profiled linings (2.2) covering joints.

7. In the secure room in accordance with claim 1, wherein a fire extinguisher installation (8) with outlet openings for extinguishing over the ceiling (3), a device (9) for removing used fire-extinguishing materials, and a control device for receiving sensor signals and triggering actuators are provided.

8. In the secure room in accordance with claim 1, wherein a length of a ceiling element (D) is equal to a multiple of a width of one of the side wall elements (S).

9. In the secure room in accordance with claim 1, wherein a width of one of the side wall elements (S) is equal to a multiple of a second width of one of the floor elements (B).

10. In the secure room in accordance with claim 1, wherein the floor (4) is in a form of a double-deck floor having a lower floor element (4.3) and a spaced-apart upper floor element (4.1), and the lower floor element (4.3) and the upper floor element (4.1) are enclosed in the side walls (2).

11. In the secure room in accordance with claim 1, wherein undersides of the side walls (2) are received in a floor profile (2.3) which is fastened on a building floor of the building, on a top the side wall elements (S) and the corner elements (E) are downwardly offset on an inside in an L-shaped cross section, and edges of the ceiling elements (D) associated with the side walls (2) are complementary offset toward the top in an L-shape, and the edges between the side walls (2) and the ceiling (3) are covered on an outside by angle-shaped profiled linings (2.2) covering joints.

12. In the secure room in accordance with claim 1, wherein the side wall elements (S), the corner elements (E), and the ceiling elements (D) are constructed in layers with outer steel layers (2.1, 3.1) on two exterior sides and with at least two inbetween fireproof layers (I, II, III).

13. In a secure room for devices in connection with information technology, having fireproof side walls (2) with a sealing door (5), a floor (4) enclosed by the side walls (2) and a ceiling (3) wherein the side walls (12), the floor (4) and the ceiling (3) are each assembled from individual elements arranged side-by-side and connected with each other, the improvement comprising:

the individual elements including side wall elements (S), one-piece corner elements (E) of the side walls (2), floor elements (B) and ceiling elements (D), fire-protective sealing elements arranged between the side wall elements (S), the corner elements (B) and the ceiling elements (D), and the side wall elements (S), the corner elements (E) and the ceiling elements (D) pressed together and aligned by connection elements (2.9, 14) which compress the sealing elements, a fire extinguisher installation (8) with outlet openings for extinguishing over the ceiling (3), a device (9) for removing used fire-extinguishing materials and, and a control device for receiving sensor signals and triggering actuators are provided.

14. In the secure room in accordance with claim 13, wherein the side wall elements (S), the corner elements (E), and the ceiling elements (D) are constructed in layers with outer steel layers (2.1, 3.1) on two exterior sides and with at least two inbetween fireproof layers (I, II, III).

15. In the secure room in accordance with claim 14, wherein a lighting fixture (7) and an air-conditioning device (12) are provided in an interior of the secure room, and supply cables are sealingly introduced into the interior through a fire-protected cable duct (19) installed in one of the side walls (2) and having a clampable packing frame (19.2) and arranged in the cable duct (19) are elastic sealing modules (19.1) which are adaptable to cables of various diameters.

16. In the secure room in accordance with claim 13, wherein undersides of the side walls (2) are received in a floor profile (2.3) which is fastened on a building floor of the building, on a top the side wall elements (S) and the corner elements (E) are downwardly offset on an inside in an L-shaped cross section, and edges of the ceiling elements (D) associated with the side walls (2) are complementary offset toward the top in an L-shape, and the edges between the side walls (2) and the ceiling (3) are covered on an outside by angle-shaped profiled linings (2.2) covering joints.

17. In a secure room for devices in connection with information technology, having fireproof side walls (2) with a door (5), a floor (4) enclosed by the side walls (2) and a ceiling (3), wherein the side walls (2), the floor (4) and the ceiling (3) are each assembled from individual elements arranged side-by-side and connected with each other, the improvement comprising:

the individual elements including side wall elements (S), one-piece corner elements (E) of the side walls (2), floor elements (B) and ceiling elements (D), wherein the side wall elements (S), the corner elements (E), and the ceiling elements (D) are constructed in layers with outer steel layers (2.1, 3.1) on two exterior sides and with at least two fireproof layers (I, II, III) between the outer steel layers (2.1, 3.1);

fire-protective sealing elements arranged between the side wall elements (S), the corner elements (E) and the ceiling elements (D);

the side wall elements (S), the corner elements (E) and the ceiling elements (D) pressed together and aligned by connection elements (2.9, 14) which compress the sealing elements;

the side wall elements (S) extending in one piece from the floor (4) to the ceiling (3) and having a first width that is in a whole number relationship with a second width of the ceiling elements (D), wherein in an assembled state two longitudinal edges of at least one of the side wall elements (S) are aligned with two associated longitudinal edges of at least one of the ceiling elements (D);

each of the ceiling elements (D) having a length that corresponds to a whole number multiple of the first width of one of the side wall elements (S); and fire-protected cable duct (19) installed in one of the side walls (2) through which supply cables are sealingly introduced into an interior of the secure room, the cable duct (19) including a clampable packing frame (19.2) and elastic sealing modules (19.1) arranged in the cable duct (19), the elastic sealing modules (19.1) being adaptable to cables of various diameters.

18. In the secure room in accordance with claim 17, wherein the floor (4) is in a form of a double-deck floor having a lower floor element (4.3) and a spaced-apart upper floor element (4.1), and the lower floor element (4.3) and the upper floor element (4.1) are enclosed in the side walls (2).

19. In the secure room in accordance with claim 17, wherein undersides of the side walls (2) are received in a floor profile (2.3) which is fastened on a building floor of the building, on a top the side wall elements (S) and the corner elements (E) are downwardly offset on an inside in an L-shaped cross section, and edges of the ceiling elements (D) associated with the side walls (2) are complementary offset toward the top in an L-shape, and the edges between the side walls (2) and the ceiling (3) are covered on an outside by angle-shaped profiled linings (2.2) covering joints.

20. In the secure room in accordance with claim 17, wherein a fire extinguisher installation (8) with outlet openings for extinguishing over the ceiling (3), a device (9) for removing used fire-extinguishing materials and a fire protection slide, and a control device for receiving sensor signals and triggering actuators are provided.

* * * * *